(12) United States Patent
Sawaguchi (10) Patent No.: US 9,383,446 B2
(45) Date of Patent: Jul. 5, 2016

(54) MOTION SENSOR

(71) Applicant: Tokyo Parts Industrial Co., Ltd., Gunma-ken (JP)

(72) Inventor: Takami Sawaguchi, Gunma-ken (JP)

(73) Assignee: Tokyo Parts Industrial Co., Ltd., Gunma-Ken (JP)

( * ) Notice: Subject to any disclaimer, the term of this patent is extended or adjusted under 35 U.S.C. 154(b) by 152 days.

(21) Appl. No.: 14/510,516

(22) Filed: Oct. 9, 2014

(65) Prior Publication Data
US 2015/0198717 A1 Jul. 16, 2015

(30) Foreign Application Priority Data

Jan. 10, 2014 (JP) .................................. 2014-002925

(51) Int. Cl.
*G06F 3/0354* (2013.01)
*G01S 17/58* (2006.01)
*G01S 17/02* (2006.01)
*G01S 7/481* (2006.01)

(52) U.S. Cl.
CPC .............. *G01S 17/58* (2013.01); *G01S 7/4811* (2013.01); *G01S 7/4813* (2013.01); *G01S 7/4815* (2013.01); *G01S 17/026* (2013.01)

(58) Field of Classification Search
CPC .... G06F 3/0354; G06F 3/03547; G01S 17/58
USPC .......... 250/216, 221, 239, 551; 345/173, 175, 345/176
See application file for complete search history.

(56) References Cited

U.S. PATENT DOCUMENTS

2003/0034439 A1* 2/2003 Reime ................. G06F 3/03547
250/221
2014/0071050 A1* 3/2014 Armstrong-Muntner G06F 3/042
345/158

FOREIGN PATENT DOCUMENTS

JP 10-148540 6/1998
JP 2008-172336 7/2008

* cited by examiner

*Primary Examiner* — Kevin Pyo
(74) *Attorney, Agent, or Firm* — Jordan and Koda PLLC (57) ABSTRACT

A motion sensor comprises: a plurality of first light emitting elements, which emit lights having mutually different characteristics in the region of movement of the object to be detected; a light receiving element, which receives reflected light that is emitted from the first light emitting elements and reflected by the object to be detected; a second light emitting element, which emits light towards the light receiving element; and a separation member. A light guiding part, which guides light emitted from the second light emitting element so as directly irradiate the light receiving element, without passing through the region of movement of the object to be detected, and light blocking parts, which block light so that light from the first light emitting elements does not directly irradiate the light receiving element, are formed integrally with the separation member.

5 Claims, 12 Drawing Sheets

MOTION SENSOR

BACKGROUND OF THE INVENTION

The present invention relates to a motion sensor that optically detects hand movements and the like.

For example, Japanese Patent Laid Open Publication No. H10-148640 describes a hand gesture detection device wherein, a device for optically detecting hand gestures comprises: a plurality of light emitting elements that emit lights having differing characteristics in a hand gesture region; a light receiving element that receives light reflected from a hand, resulting from the light emitted from the light emitting elements; and a detector that detects the movement direction and movement velocity of hand gestures on the basis of changes over time in the differences and sums of the amount of reflected light received by the light receiving element, from the hand, resulting from the light emitted from the light emitting elements.

With the hand gesture detection device described in Japanese Patent Laid Open Publication No. H10-148640, it is possible to detect the movement direction and the movement velocity of hand gestures and, for example, while driving an automobile, it is possible for the driver to adjust the volume of a car stereo, or adjust the temperature of the air conditioner or the like, without looking at the instrumentation.

Furthermore, Japanese Patent Laid Open Publication No. 2008-172336 describes a photoelectric sensor comprising: a light receiving element that receives light wherein pulsed light incident from a detection region is biased by DC light; a first projection element that projects pulsed light towards the detection region; and a second projection element that projects DC light directly toward the light receiving element.

With the photoelectric sensor described in Japanese Patent Laid Open Publication No. 2008-172336, by providing a light source that irradiates the light receiving element with direct light (second projection element) is possible to improve the response time of the photoelectric sensor.

However, with the hand gesture detection device described in Japanese Patent Laid Open Publication No. H10-148640, there is a possibility of errors if the light receiving element is irradiated with direct light from a plurality of light emitting elements, and no countermeasure for the same is set forth. Furthermore, because this is directed to operating a car stereo or air conditioner, there is no need for the sensor to have a rapid response speed, and thus no particular consideration is given to improving sensor response speeds.

Furthermore, with the device described in Japanese Patent Laid Open Publication No. 2008-172336, while consideration has been given to sensor response speeds, there is basically only one first projection element that projects pulsed light toward the detection region, and therefore the configuration will not detect the movement direction and movement velocity of the hand gesture. Furthermore, there is a risk that light leaking, from the light source that serves for irradiation with direct light, into the detection region, will be reflected by the detection object, and this reflected light will be detected by the light receiving element, resulting in an error, but no countermeasure for the same is set forth.

SUMMARY OF THE INVENTION

One or more embodiments of the present invention provide a motion sensor capable of solving the problems of the prior art described above. Hereafter, aspects of the present invention are described. Note that, in the aspects described below, the constituent elements used can be used in the most freely chosen combinations possible. Furthermore, the aspects and technical features of the present invention are not limited to those described hereafter, and are to be understood based on the description in the entire specification and the drawings, or based on the inventive ideas that can be grasped by the skilled artisan on the basis of these descriptions.

The first aspect of the present invention relating to a motion sensor comprises:

a plurality of first light emitting elements arranged spaced apart in the direction of movement of the object to be detected, which emit lights having mutually different characteristics in the region of movement of the object to be detected;

a light receiving element, which receives reflected light that is emitted from the plurality of first light emitting elements and reflected by the object to be detected;

a second light emitting element, which emits light towards the light receiving element;

a separation member arranged between the plurality of first light emitting elements; and a circuit board.

Further, the separation member comprises a light guiding part, which guides light emitted from the second light emitting element so as to directly irradiate the light receiving element, without passing through the region of movement of the object to be detected, and light blocking parts, which extend from the light guiding part, and block light so that light from the plurality of first light emitting elements does not directly irradiate the light receiving element.

Furthermore, the circuit board comprises a detection circuit, which detects the movement of the object to be detected, by way of variations in the amount of light received by the light receiving element.

The second aspect of the present invention relating to a motion sensor is such that:

the circuit board is arranged substantially parallel to the direction of movement of the object to be detected;

the plurality of first light emitting elements, the second light emitting element, the light receiving element and the separation member are arranged on the front face of the circuit board;

the light guiding part of the separation member forms a cylinder having an opening on one side;

the second light emitting element is received in the light guiding part; and the light receiving element is arranged at a position facing the opening.

The third aspect of the present invention relating to a motion sensor is such that:

the circuit board is arranged substantially parallel to the direction of movement of the object to be detected;

the plurality of first light emitting elements, the light receiving element and the separation member are arranged on the front face of the circuit board;

the second light emitting element is arranged on the back face of the circuit board so as to close a through hole formed in the circuit board;

the light guiding part of the separation member forms a cylinder having an opening on one side, which is positioned above the through hole; and the light receiving element is arranged at a position facing the opening.

The fourth aspect of the present invention relating to a motion sensor is such that:

the light blocking parts of the separation member comprise walls, which extend from the edge of the opening, and which are arranged between the first light emitting elements and the light receiving element.

According to one or more embodiments of the present invention, the response speed of the motion sensor can be improved by directly irradiating the light receiving element with light emitted from the second light emitting element. In addition, it is possible to prevent motion sensor errors by preventing irradiation of the light receiving element by direct light from the plurality of first light emitting elements and light reflected by the object to be detected, coming from the second light emitting element.

DETAILED DESCRIPTION OF THE PREFERRED EMBODIMENTS

Hereafter, an exemplary embodiment of the motion sensor of the present invention is described with reference to the drawings. Note that each of the exemplary modes of embodiment described below constitute an example of means for implementing the present invention, and the exemplary modes of embodiment described below can be suitably varied without departing from the gist of the present invention.

First Exemplary Embodiment

Figure 1:
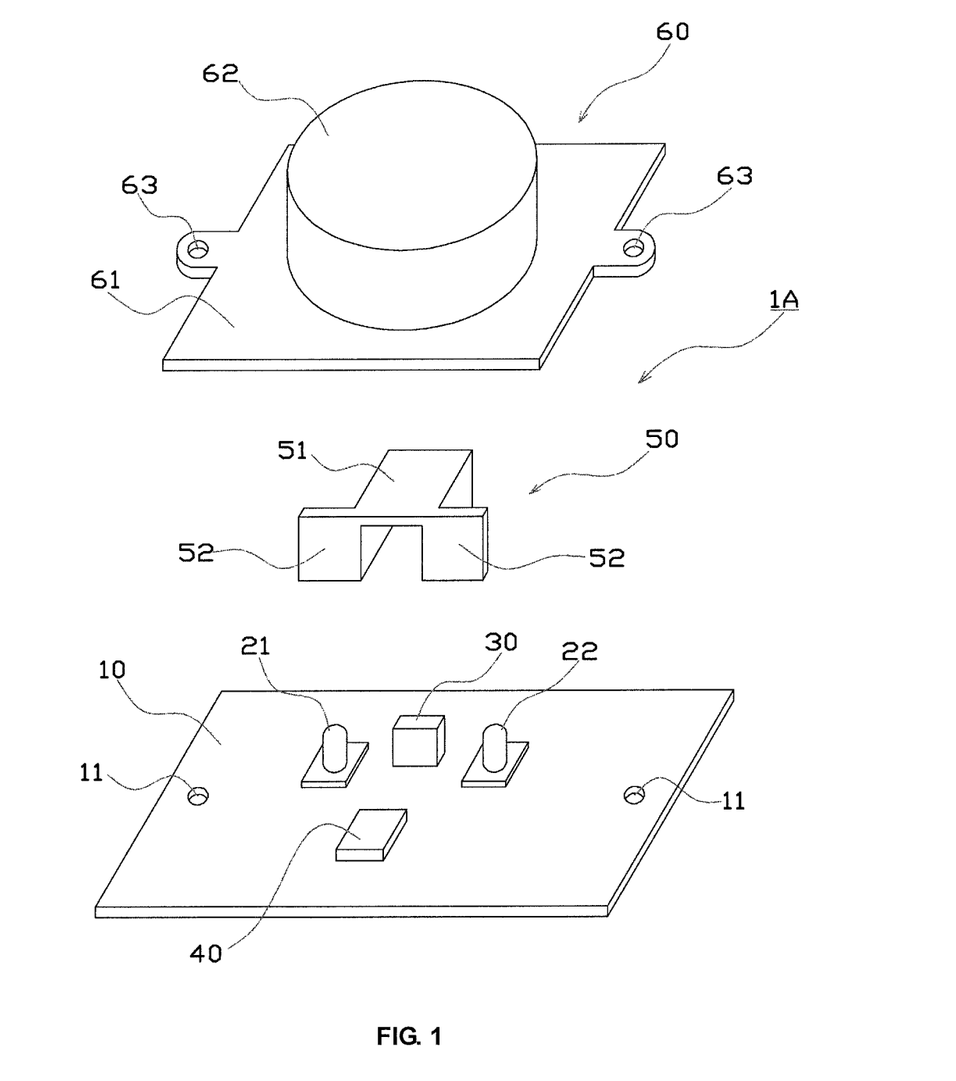
FIG. 1 is an exploded perspective view of a motion sensor according to a first exemplary mode of embodiment of the present invention.
Figure 2:
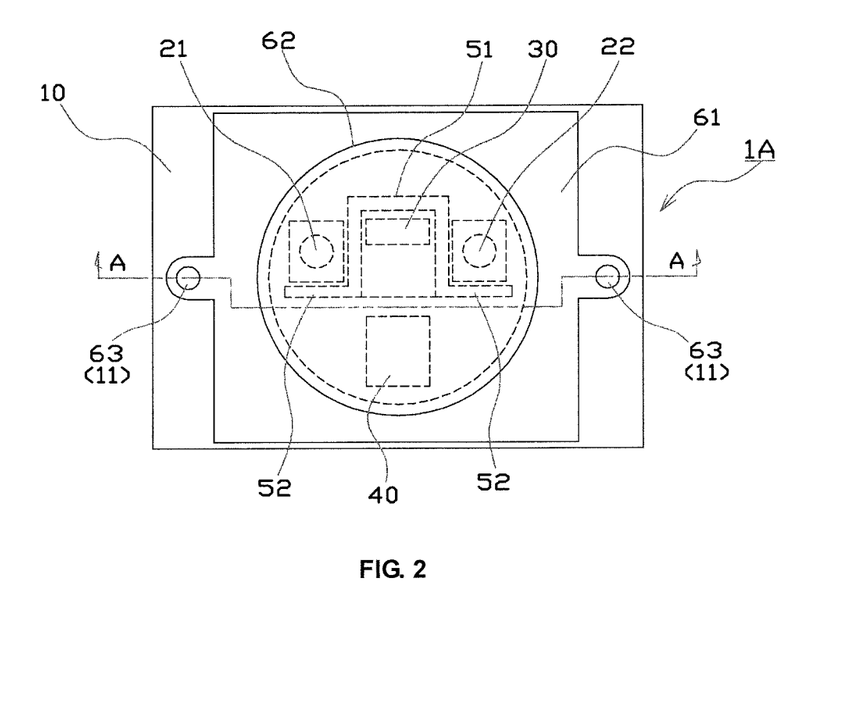
FIG. 2 is plain view of a motion sensor according to a first exemplary mode of embodiment of the present invention.

A motion sensor 1A according to a first exemplary embodiment of the present invention will be described using FIGS. 1 to 3. The motion sensor 1A in this example comprises: a circuit board 10; two first light emitting elements 21, 22; one second light emitting element 30; one light receiving element 40; a separation member 50 and a cover member 60. This motion sensor 1A is configured such that light is projected from the first light emitting elements 21, 22, through the cover member 60, into a region of movement of an object to be detected M; and light reflected from the object to be detected M once again passes through the cover member 60 and is received by the light receiving element 40, allowing the presence and movement of the object to be detected M to be detected.

The circuit board 10 is provided with: a drive circuit, which drives the first light emitting elements 21, 22 and the second light emitting element 30; a detection circuit, which uses variations in the amount of light received by the light receiving element 40 to detect the presence and movement of the object to be detected M; a control circuit, and the like. Furthermore, a plurality of mounting holes 11 are provided in the circuit board 10, for fixing the cover member 60 in place with screws or the like. This circuit board 10 is mounted substantially parallel to the direction of movement of the object to be detected M.

The first light emitting elements 21, 22 are constituted by LEDs which emit infrared light, and are arranged on the circuit board 10 spaced apart at a predetermined interval in the direction of movement of the object to be detected M. These first light emitting elements 21, 22 are driven by the drive circuit so as to emit lights having mutually different characteristics in the region of movement of the object to be detected M. The first light emitting elements 21, 22 in this example emit pulsed light with mutually different phases (timings) in the region of movement of the object to be detected M.

The light receiving element 40 is constituted by a photodiode or photo transistor, and is arranged on the circuit board 10. This light receiving element 40 is arranged in a position allowing it to receive reflected light, which is emitted by the first light emitting elements 21, 22 and reflected by the object to be detected M, and light emitted by the second light emitting element 30.

The second light emitting element 30 is constituted by an LED that emits infrared light, and emits light toward the light receiving element 40. This second light emitting element 30 is arranged on the circuit board 10, between the first light emitting element 21, and the first light emitting element 22.

The separation member 50, which is constituted by a machined metal part or a molded resin part, and which reflects infrared light without transmitting the same, is fixed in place on the circuit board 10. A light guiding part 51 and light blocking parts 52 are formed integrally with this separation member 50.

The light guiding part 51 is a part that guides light emitted by the second light emitting element 30 so as to irradiate the light receiving element 40 without passing through the region of movement of the object to be detected M, and is arranged between the first light emitting elements 21, 22. This light guiding part 51 forms a cylinder having an opening on one side (downward in FIG. 2) and receives the second light emitting element 30 therein. Furthermore, the light receiving element 40 is arranged at a position facing the opening portion on one side of the light guiding part 51, so that light emitted by the second light emitting element 30 directly irradiates the light receiving element 40 via the opening portion in the light guiding part 51, without irradiating the region of movement of the object to be detected M.

The light blocking parts 52 are parts that block light so that light emitted by the first light emitting elements 21, 22 does not directly irradiate the light receiving element 40. These light blocking parts 52 consist of walls that extend from the opening portion of the light guiding part 51, in both the left and right directions in FIG. 2. These two light blocking parts 52 are positioned between the first light emitting elements 21, 22 and the light receiving element 40, respectively, and are formed to a height above the surface of the circuit board 10 that is higher than the first light emitting elements 21, 22 and the light receiving element 40, so that light emitted by the first light emitting elements 21, 22 does not directly irradiate the light receiving element 40.

The cover member 60 comprises a flat part 61 for mounting on the circuit board 10, and a cylindrical receiving part 62 that covers and protects the first light emitting elements 21, 22, the second light emitting element 30, the light receiving element 40, the separation member 50, and various non-illustrated circuits on the circuit board 10. A plurality of mounting holes 63 are provided in the flat part 61 for fixing the cover member 60 in place on the circuit board 10 with screws or the like.

In this example, an infrared transmitting filter, which absorbs substantially all visible light and transmits infrared light is used for the cover member 60, such that there will be minimal irradiation of the light receiving element 40 with light other than infrared light.

As described above, the motion sensor 1A in this example comprises: a plurality of first light emitting elements 21, 22, which are arranged spaced apart in the direction of movement of the object to be detected M, and emit lights having mutually different characteristics in the region of movement of the object to be detected M; a light receiving element 40, which receives reflected light that is emitted by the first light emitting elements 21, 22 and reflected by the object to be detected M; and a second light emitting element 30, which emits light toward this light receiving element 40. Furthermore, the motion sensor 1A in this example comprises: a light guiding part 51, which is arranged between the first light emitting elements 21, 22, and guides light so that the light emitted by the second light emitting element 30 directly irradiates the light receiving element 40, without passing through the region of movement of the object to be detected M; and a separation member 50, having integrally formed light blocking parts 52, which block light from the first light emitting elements 21, 22 so that the light does not directly irradiate the light receiving element 40. Further, the motion sensor 1A in this example comprises a circuit board 10 on which a detection circuit is mounted for detecting the movement of the object to be detected M by way of variations in the amount of light received by the light receiving element 40.

The motion sensor 1A in this example can detect the presence and movement of the object to be detected M by the same principle as in the detection device described in Japanese Patent Laid Open Publication No. H10-148640, described above.

The detection operations with the motion sensor 1A in this example will be briefly described.

First, the two first light emitting elements 21, 22 emit pulsed light having mutually different phases, toward the region of movement of the object to be detected M.

If the object to be detected M is present in the light path of the pulsed light emitted by the first light emitting elements 21, 22, the pulsed light is reflected, and that reflected light is received by the light receiving element 40. Because the light emitted by the first light emitting elements 21, 22 is pulsed light having mutually different phases, it is easy to differentially detect reflected light from the first light emitting element 21 and reflected light from the first light emitting element 22 in the light received by the light receiving element 40. Specifically, by sampling the received light signals from the light receiving element 40 in synchronization with pulse signals that control the drives of the first light emitting elements 21, 22, it is possible to distinguish reflected light coming from each of the first light emitting elements.

Then, the presence and the movement of the object to be detected M can, for example, be detected on the basis of the changes over time in the reflected light from each of the first light emitting element 21 and the first light emitting element 22.

Figure 3:
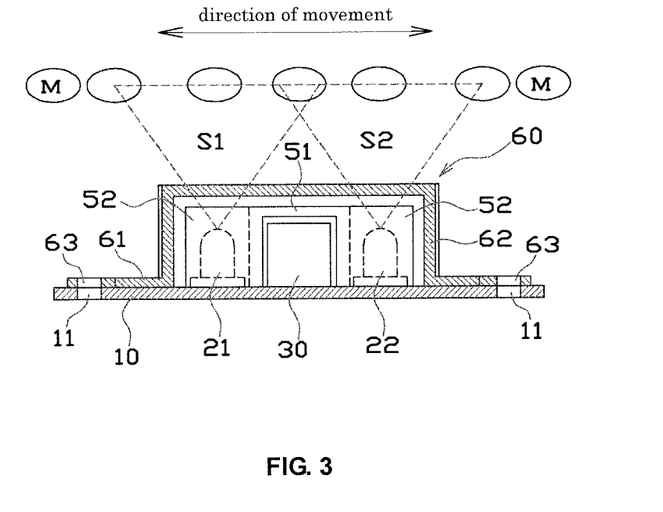
FIG. 3 is a sectional view at the line A-A in FIG. 2.

Note that, in FIG. 3, in the region of movement of the object to be detected M, there is a slight overlap between a region S1, which is irradiated with pulsed light emitted from the first light emitting element 21, and a region 52, which is irradiated with pulsed light emitted from the first light emitting element 22, but these may also be completely separate. Furthermore, the irradiation regions S1, S2 can be produced using the directionality of the first light emitting elements themselves, or by way of adjustment using lenses, and may also be produced by using the separation member 50. Furthermore, because the separation member 50 is arranged between the two first light emitting elements 21, 22, which are arranged spaced apart in the direction of movement of the object to be detected M, the irradiation regions S1, S2 can be adjusted by suitably establishing the planar size and height of the separation member 50.

With the motion sensor 1A in this example, it is possible to improve the response speed of the light receiving element 40 by providing the second light emitting element 30, which emits light toward the light receiving element 40.

Furthermore, because light blocking parts 52 are provided, which block light from the first light emitting elements 21, 22 so as not to directly irradiate the light receiving element 40, the light receiving element 40 is not irradiated with direct light from the first light emitting elements 21, 22 and thus it is possible to reliably prevent errors resulting from detection of this direct light.

Furthermore, with the motion sensor 1A in this example, because the light guiding part 51 is provided, which guides light emitted by the second light emitting element 30 so as to irradiate the light receiving element 40, without passing through the region of movement of the object to be detected M, it is possible to effectively prevent irradiation of the light receiving element 40 by reflected light emitted from the second light emitting element 30 and reflected by the object to be detected M, allowing errors to be still more reliably prevented.

Furthermore, with the motion sensor 1A in this example, the light guiding part 51 and the light blocking parts 52 are constituted by the separation member 50, which is a single piece, which minimizes the number of parts, allowing for effective prevention of errors.

Furthermore, with the motion sensor 1A in this example, the first light emitting elements 21, 22, the second light emitting element 30, the light receiving element 40 and the separation member 50 are arranged on the front face of the circuit board 10. In addition, the light guiding part 51 of the separation member 50 forms a cylinder having an opening on one side, and the second light emitting element 30 is received in this light guiding part 51, while the light receiving element 40 is arranged at a position facing the opening in the light guiding part 51. Consequently, the overall size of the motion sensor can be minimized and errors can be reliably prevented.

Second Exemplary Embodiment

Figure 4:
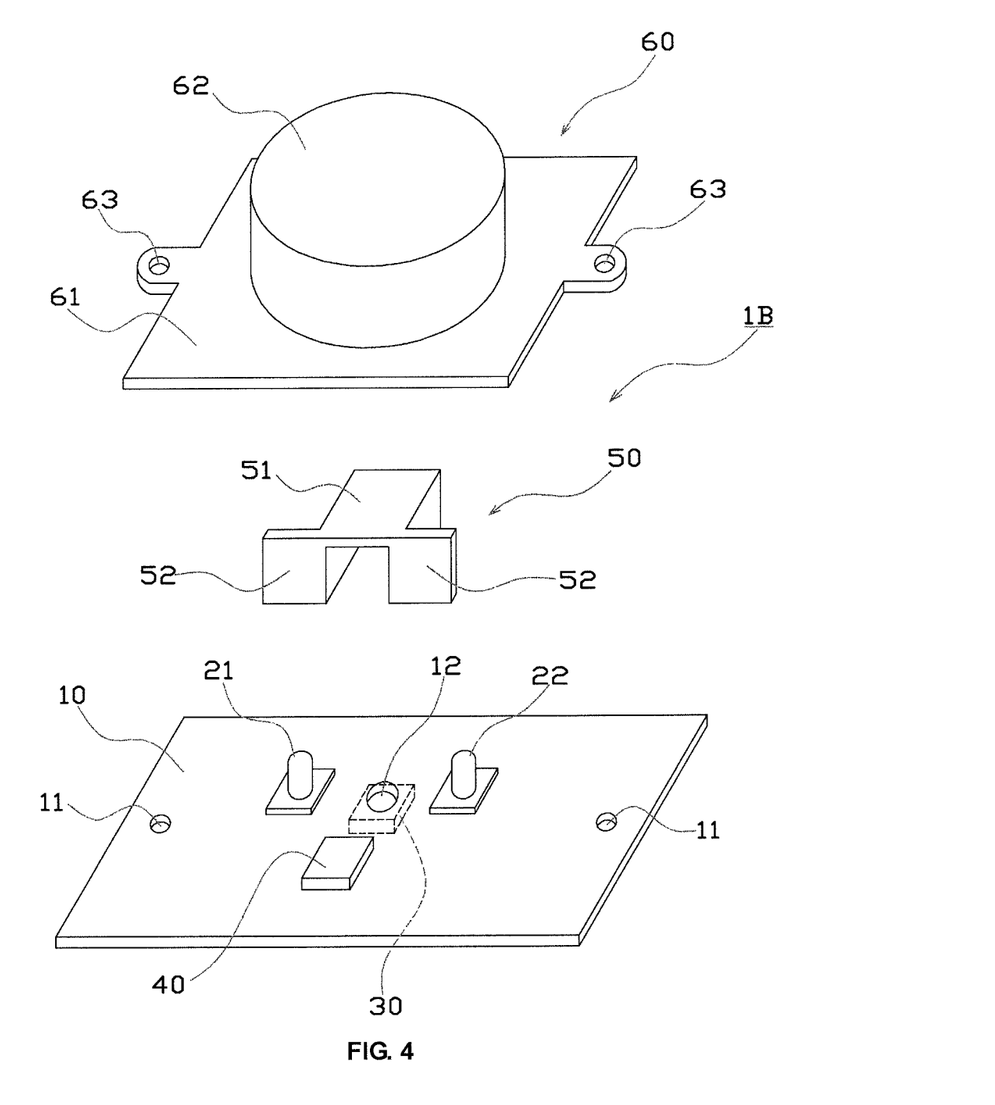
FIG. 4 is an exploded perspective view of a motion sensor according to a second exemplary mode of embodiment of the present invention.
Figure 5:
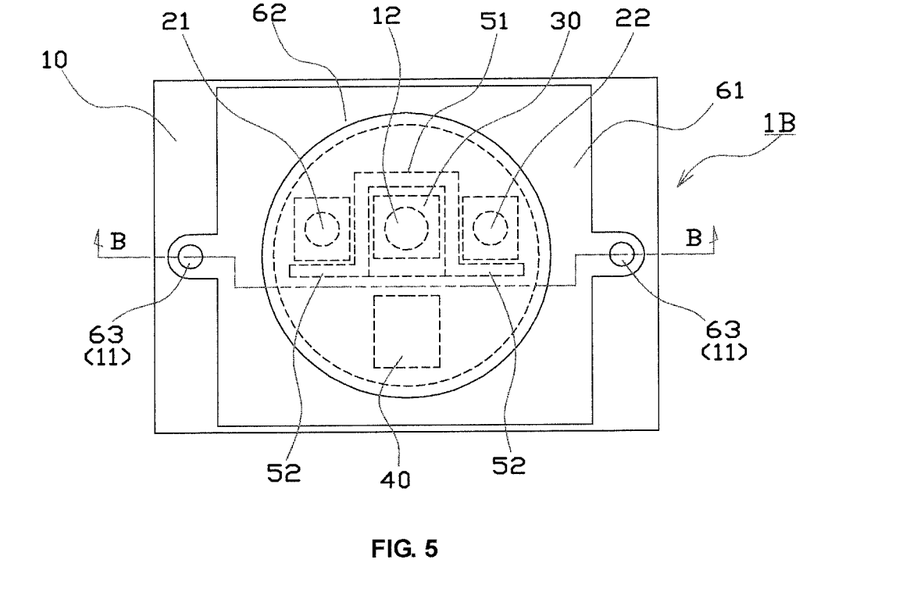
FIG. 5 is plain view of a motion sensor according to the second exemplary mode of embodiment of the present invention.
Figure 6:
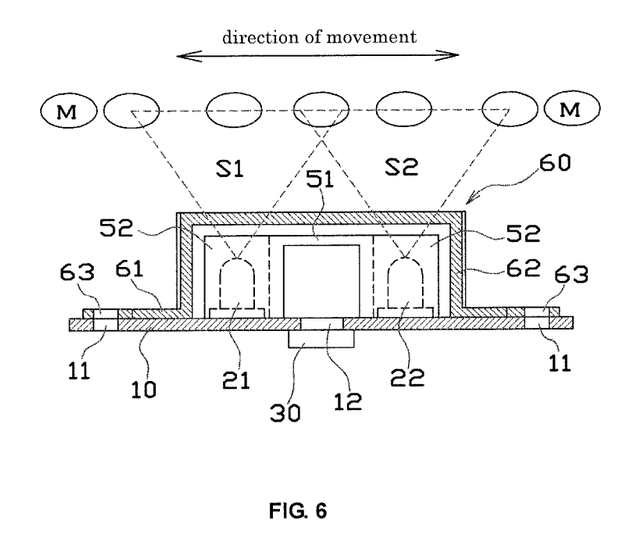
FIG. 6 is a sectional view at the line B-B in FIG. 5.

A motion sensor 1B according to a second exemplary embodiment of the present invention will be described using FIG. 4 to FIG. 6. Note that, in FIG. 4 to FIG. 6, the constituent elements to which the same reference numerals as in FIG. 1 to FIG. 3 are applied indicate the same constituent elements, and repeated descriptions of the same are omitted.

A major difference between the motion sensor 1B in this example and the motion sensor 1A according to the first exemplary embodiment is that, with the motion sensor 1B in this example, the second light emitting element 30 is provided on the back face of the circuit board 10. For this reason, a through hole 12 is provided in the circuit board 10 of the motion sensor 1B in this example, and the second light emitting element 30 is arranged on the back face of the circuit board 10 so as to close this through hole 12.

The through hole 12 is provided at an intermediate position between the first light emitting element 21 and the first light emitting element 22. Meanwhile, the light guiding part 51 of the separation member 50 is positioned above the through hole 12, so as to cover the through hole 12, and is formed as a bottomed cylinder having an opening on one side (downward in FIG. 5). Furthermore, the light receiving element 40 is arranged at a position facing the opening portion of the light guiding part 51, and light emitted from the second light emitting element 30 irradiates the light receiving element 40 via the opening portion of the light guiding part 51, after passing through the through hole 12.

As in the motion sensor 1A, in the motion sensor 1B in this example, the response speed can be improved by the second light emitting element 30, and errors can be effectively prevented because direct light from the first light emitting elements 21, 22 and light reflected from the object to be detected M, coming from the second light emitting element 30, will not irradiate the light receiving element 40.

In addition, because the second light emitting element 30 is provided on the back face of the circuit board 10 of the motion sensor 1B in this example, it is possible to increase the degree of freedom in arranging the elements. Consequently, depending on the usage, it is for example possible to decrease the spacing between the plurality of first light emitting elements 21, 22 or to change the design in terms of the overall planar size of the motion sensor so as to improve the versatility.

Third Exemplary Embodiment

Figure 7:
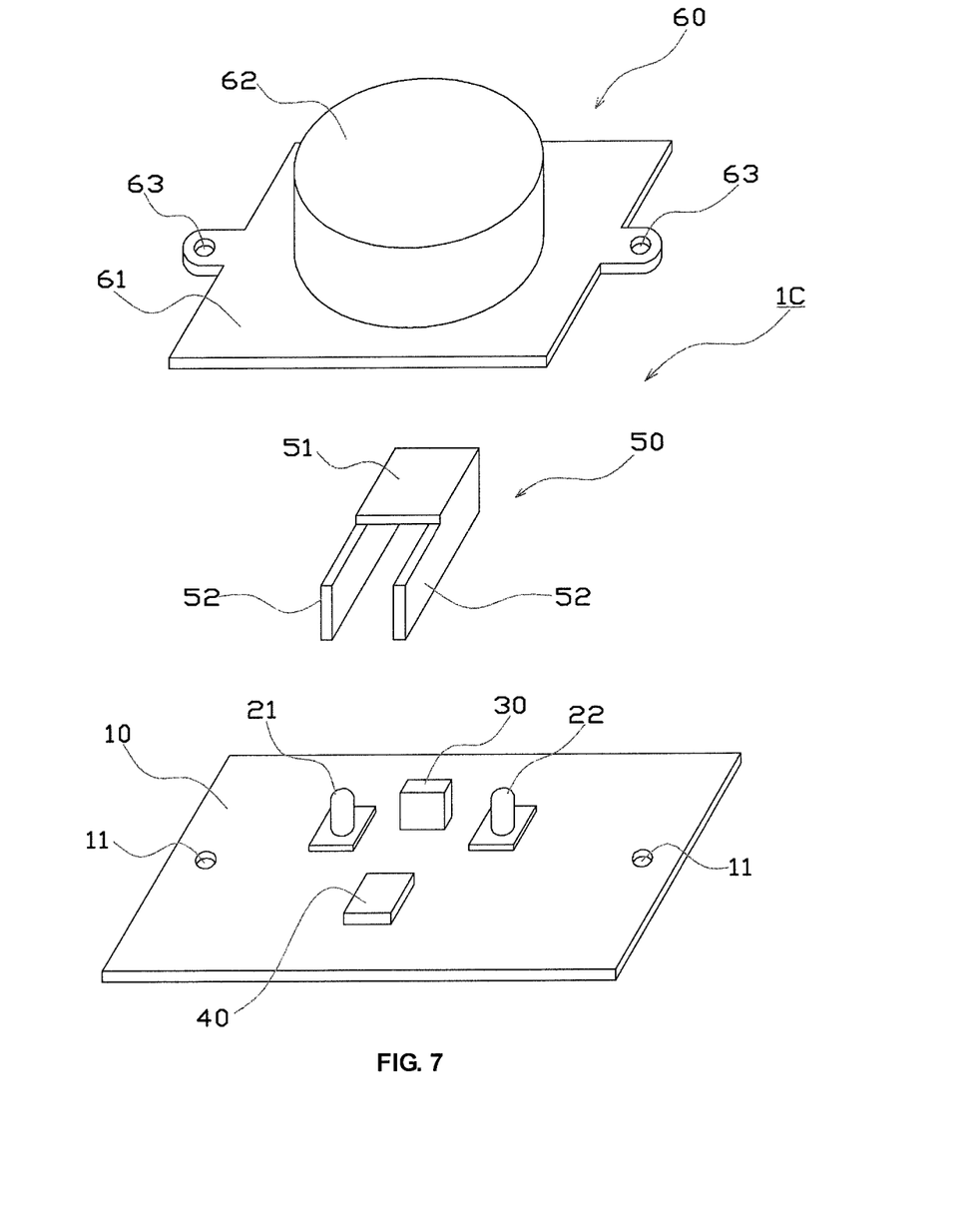
FIG. 7 is an exploded perspective view of a motion sensor according to a third exemplary embodiment of the present invention.
Figure 8:
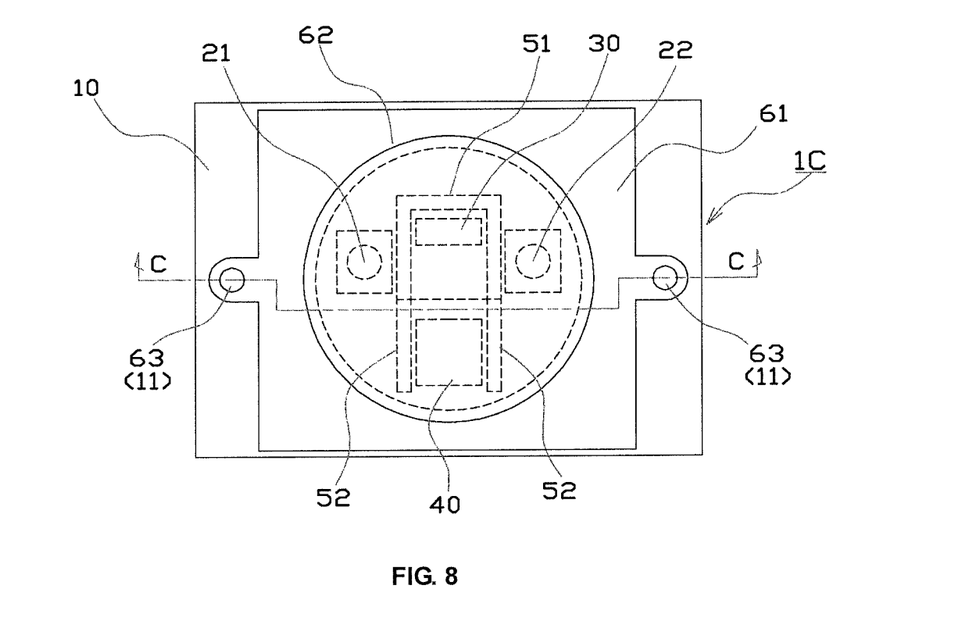
FIG. 8 is plain view of a motion sensor according to the third exemplary mode of embodiment of the present invention.
Figure 9:
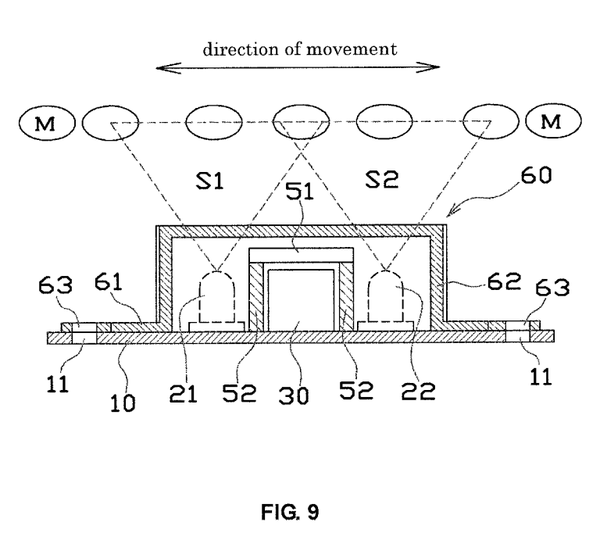
FIG. 9 is a sectional view at the line C-C in FIG. 8.

A motion sensor 1C according to a third exemplary embodiment of the present invention will be described using FIG. 7 to FIG. 9. Note that, in FIG. 7 to FIG. 9, the constituent elements to which the same reference numerals as in FIG. 1 to FIG. 3 are applied indicate the same constituent elements, and repeated descriptions of the same are omitted.

The main difference between the motion sensor 1C in this example and the motion sensor 1A according to the first exemplary mode of embodiment is the shape of the separation member 50.

With the separation member 50 in this example, the two light blocking parts 52 are walls extending from the opening portion of the light guiding part 51 toward the light receiving element 40 (downward in FIG. 8), and the light receiving element 40 is arranged between these light blocking parts 52. These light blocking parts 52 are formed to a height from the surface of the circuit board 10 which is higher than the first light emitting elements 21, 22 and the light receiving element 40, such that light emitted from the first light emitting elements 21, 22 will not directly irradiate the light receiving element 40.

As in the motion sensor 1A, in the motion sensor 1C in this example, the response speed can be improved by the second light emitting element 30, and errors can be effectively prevented because direct light from the first light emitting elements 21, 22 and light reflected from the object to be detected M, coming from the second light emitting element 30, will not irradiate the light receiving element 40.

Further, with the motion sensor 1B in this example, the light blocking parts 52 also combine the function of assisting the light guiding part 51 so that the light receiving element 40 can be very effectively irradiated with light emitted from the second light emitting element 30. Consequently, the possibility of the light receiving element 40 being irradiated with light reflected from the object to be detected M, coming from the second light emitting element 30, is extremely low, allowing errors to be still more reliably prevented.

Fourth Exemplary Embodiment

Figure 10:
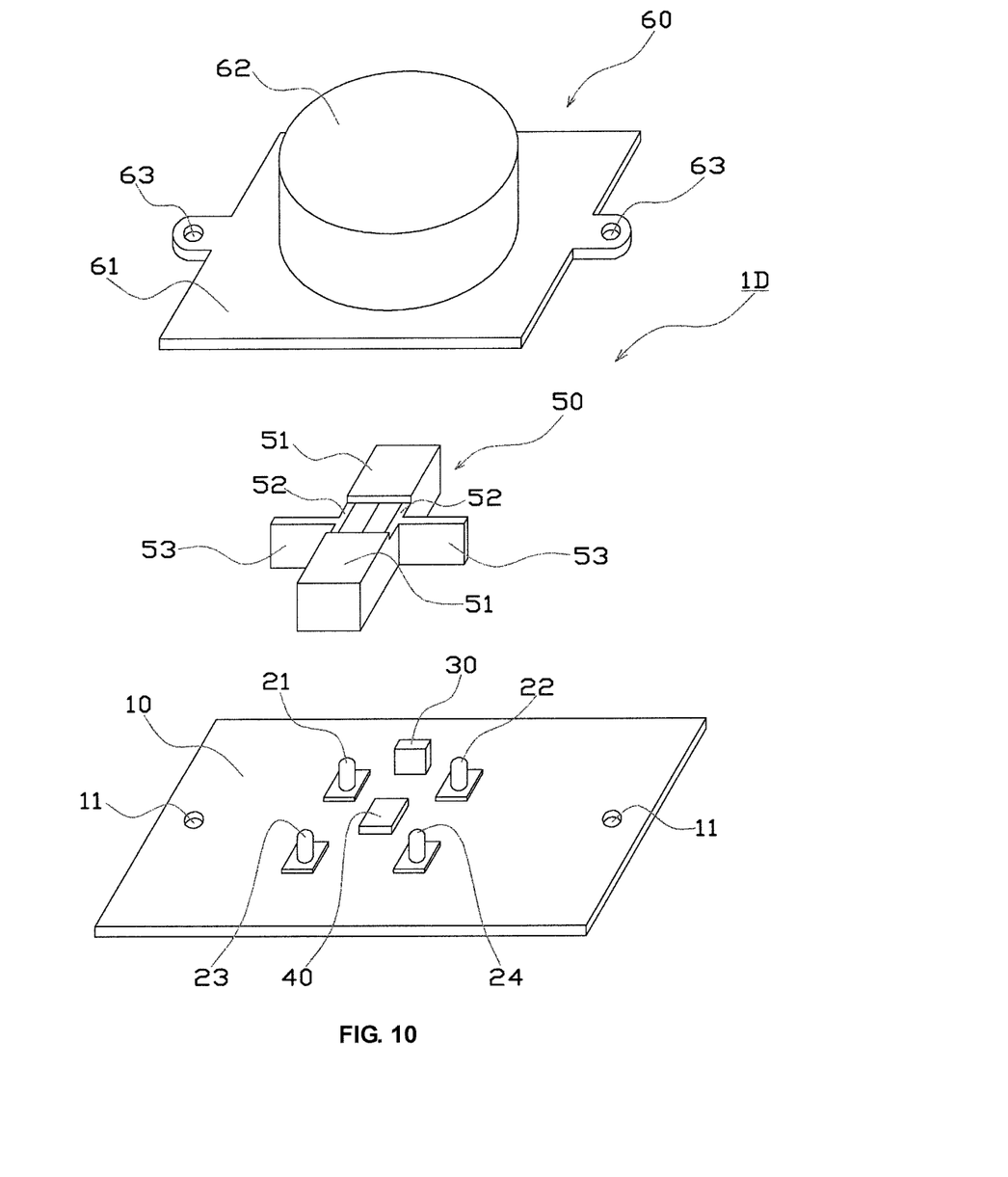
FIG. 10 is an exploded perspective view of a motion sensor according to a fourth exemplary embodiment of the present invention.
Figure 11:
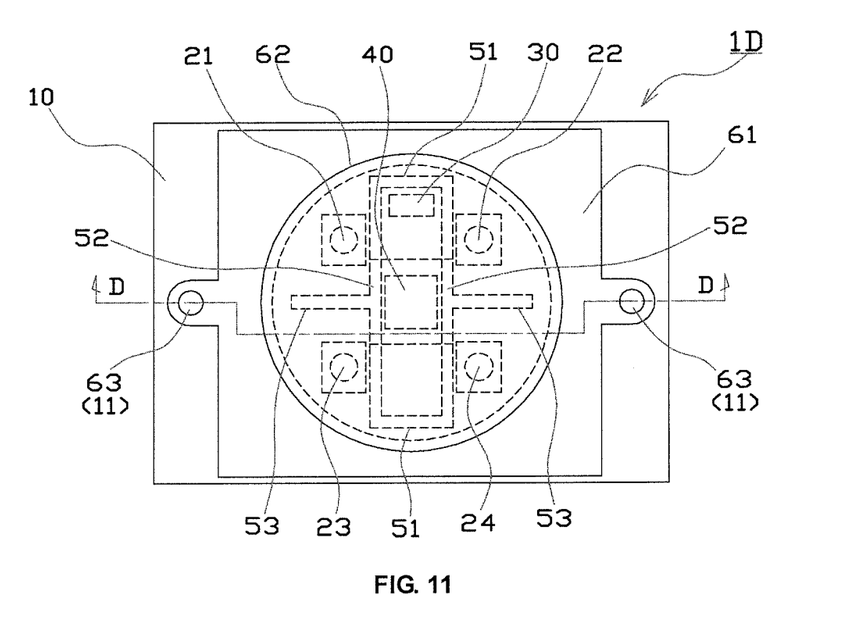
FIG. 11 is plain view of a motion sensor according to the fourth exemplary embodiment of the present invention.
Figure 12:
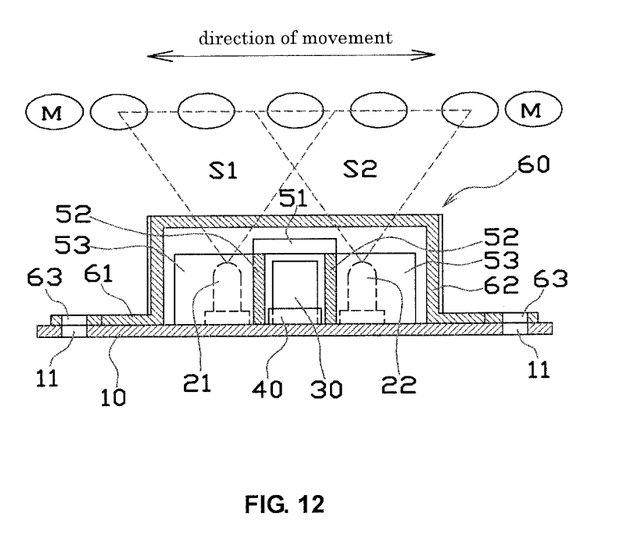
FIG. 12 is a sectional view at the line D-D in FIG. 11.

A motion sensor 1D according to a fourth exemplary embodiment of the present invention will be described using FIG. 10 to FIG. 12. Note that, in FIG. 10 to FIG. 12, the constituent elements to which the same reference numerals as in FIG. 1 to FIG. 3 are applied indicate the same constituent elements, and repeated descriptions of the same are omitted.

The main difference between the motion sensor 1D in this example and the motion sensor 1A according to the first exemplary embodiment is the number of first light emitting elements and the shape of the separation member 50.

With the motion sensor 1D in this example, four first light emitting elements 21, 22, 23 and 24 are used to detect two-dimensional movement of the object to be detected. These first light emitting elements are configured by way of a drive circuit so as to emit pulsed light having mutually different phases in the region of movement of the object to be detected M. The first light imaging elements 21, 22, 23, 24 are arranged uniformly spaced apart at the vertices of a square, and the light receiving element 40 is arranged in the area of the center of these first light emitting elements. Note that the motion sensor 1D in this example can detect the presence and the two-dimensional movement of the object to be detected M, by the same principle as in the detection device described in Japanese Patent Laid Open Publication No. H10-148640, described above.

Two light guiding parts 51 formed as bottomed cylinders having openings on one side are provided in the separation member 50 in this example, and the second light emitting element 30 is received at the interior of one light guiding part 51.

Furthermore, two light blocking parts 52 are provided continuing from the opening portions of the two light guiding parts 51, and the light receiving element 40 is arranged facing the opening of the light guiding part 51 between the two light blocking parts 52. These light blocking parts 52 are formed to a height from the surface of the circuit board 10 which is higher than the first light emitting elements 21, 22, 23, 24 and the light receiving element 40, such that light emitted from the first light emitting elements 21, 22, 23, 24 will not directly irradiate the light receiving element 40.

Further, partition walls 53 extend to the exterior from the two light blocking parts 52. One partition wall 53 is positioned midway between the first light emitting elements 21, 23, which adjusts the irradiation region of the first light emitting elements 21, 23. The other partition wall 53 is positioned midway between the first light emitting elements 22, 24, which adjusts the irradiation region of the first light emitting elements 22, 24.

As in the motion sensor 1A, in the motion sensor 1D in this example, the response speed can be improved by the second light emitting element 30, and errors can be effectively prevented because direct light from the first light emitting elements 21, 22 and light reflected from the object to be detected M, coming from the second light emitting element 30, will not irradiate the light receiving element 40.

Further, with the motion sensor 1D in this example, the light blocking parts 52 also combine the function of assisting the light guiding part 51 so that the light receiving element 40 can be very effectively irradiated with light emitted from the second light emitting element 30, without passing through the region of movement of the object to be detected M.

Four exemplary embodiments of the motion sensor of the present invention have been described above but, for example, the number of first light emitting elements, the arrangement of the elements, the shape of the separation member and the like can be suitably varied according to the usage of the sensor. Furthermore, there are no particular restrictions on the method of detecting the presence and movement direction of the object to be detected M, and for example, the second light emitting element 30 can be controlled so that the light receiving signal from the light receiving element 40 is complemented so as to reach a given fixed level, and the presence and movement direction of the object to be detected M can be detected on the basis of this control signal for the second light emitting element 30.

Furthermore, if the motion sensor of the present invention is incorporated in a conventional keyless entry system or smart entry system, as a sensor for releasing an openable and closable element such as a vehicle door or trunk, the motion sensor may be installed within a door handle or the like, and an actuator that opens and closes the door may be operated by the detection signal for the object to be detected M.

What is claimed is:

1. A motion sensor that detects the movement of an object to be detected, comprising:
   a plurality of first light emitting elements arranged spaced apart in the direction of movement of the object to be detected, which emit lights having mutually different characteristics in the region of movement of the object to be detected;
   a light receiving element, which receives reflected light that is emitted from the plurality of first light emitting elements and reflected by the object to be detected;
   a second light emitting element, which emits light towards the light receiving element;
   a separation member arranged between the plurality of first light emitting elements; and
   a circuit board,
   wherein the separation member comprises a light guiding part, which guides light emitted from the second light emitting element so as to directly irradiate the light receiving element, without passing through the region of movement of the object to be detected, and light blocking parts, which extend from the light guiding part, and block light so that light from the plurality of first light emitting elements does not directly irradiate the light receiving element, and
   the circuit board comprises a detection circuit, which detects the movement of the object to be detected, by way of variations in the amount of light received by the light receiving element.

2. The motion sensor recited in claim 1, wherein:
   the circuit board is arranged parallel to the direction of movement of the object to be detected;
   the plurality of first light emitting elements, the second light emitting element, the light receiving element and the separation member are arranged on the front face of the circuit board;
   the light guiding part of the separation member forms a cylinder having an opening on one side;
   the second light emitting element is received in the light guiding part; and
   the light receiving element is arranged at a position facing the opening.

3. The motion sensor recited in claim 2, wherein:
   the light blocking parts of the separation member comprise walls, which extend from the edge of the opening, and which are arranged between the first light emitting elements and the light receiving element.

4. The motion sensor recited in claim 1, wherein:
   the circuit board is arranged parallel to the direction of movement of the object to be detected;
   the plurality of first light emitting elements, the light receiving element and the separation member are arranged on the front face of the circuit board;
   the second light emitting element is arranged on the back face of the circuit board so as to close a through hole formed in the circuit board;
   the light guiding part of the separation member forms a cylinder having an opening on one side, which is positioned above the through hole; and
   the light receiving element is arranged at a position facing the opening.

5. The motion sensor recited in claim 4, wherein:
   the light blocking parts of the separation member comprise walls, which extend from the edge of the opening, and which are arranged between the first light emitting elements and the light receiving element.

\* \* \* \* \*